(12) United States Patent
Osborn et al.

(10) Patent No.: US 8,957,858 B2
(45) Date of Patent: Feb. 17, 2015

(54) MULTI-PLATFORM MOTION-BASED COMPUTER INTERACTIONS

(75) Inventors: Dan Osborn, Redmond, WA (US); Christopher Willoughby, Kenmore, WA (US); Brian Mount, Seattle, WA (US); Vaibhav Goel, Seattle, WA (US); Tim Psiaki, Kirkland, WA (US); Shawn C. Wright, Sammamish, WA (US); Christopher Vuchetich, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 677 days.

(21) Appl. No.: 13/117,605

(22) Filed: May 27, 2011

(65) Prior Publication Data
US 2012/0299827 A1 Nov. 29, 2012

(51) Int. Cl.
  G09G 5/08 (2006.01)
  G06F 3/0488 (2013.01)
  G06F 3/00 (2006.01)

(52) U.S. Cl.
  CPC ............... *G09G 5/08* (2013.01); *G06F 3/0488* (2013.01); *G06F 3/005* (2013.01); *G09G 2354/00* (2013.01)
  USPC ....................................................... 345/158

(58) Field of Classification Search
  USPC ............ 345/158, 173, 178; 600/301; 702/160
  See application file for complete search history.

(56) References Cited

U.S. PATENT DOCUMENTS

| | | | |
|---|---|---|---|
| 7,831,752 B2 | 11/2010 | Illowsky et al. | |
| 2007/0021213 A1 | 1/2007 | Foe et al. | |
| 2007/0139366 A1 | 6/2007 | Dunko et al. | |
| 2010/0122174 A1* | 5/2010 | Snibbe et al. | 715/733 |
| 2010/0160744 A1* | 6/2010 | Ha et al. | 600/301 |
| 2010/0256949 A1* | 10/2010 | Ohmori et al. | 702/160 |
| 2010/0317419 A1 | 12/2010 | Osborne | |

OTHER PUBLICATIONS

Malfatti, et al., "Using Mobile Phones to Control Desktop Multiplayer Games", Retrieved at <<http://nti.catolica-to.edu.br/Material/Artigos/MobilePhonesControl.pdf>>,Retrieved Date: Mar. 1, 2011, pp. 7.

* cited by examiner

*Primary Examiner* — Michael Faragalla
(74) *Attorney, Agent, or Firm* — Aaron Chatterjee; Kate Drakos; Micky Minhas

(57) ABSTRACT

Systems and methods for multi-platform motion interactivity, is provided. The system includes a motion-sensing subsystem, a display subsystem including a display, a logic subsystem, and a data-holding subsystem containing instructions executable by the logic subsystem. The system configured to display a displayed scene on the display; receive a dynamically-changing motion input from the motion-sensing subsystem that is generated in response to movement of a tracked object; generate, in real time, a dynamically-changing 3D spatial model of the tracked object based on the motion input; control, based on the movement of the tracked object and using the 3D spatial model, motion within the displayed scene. The system further configured to receive, from a secondary computing system, a secondary input; and control the displayed scene in response to the secondary input to visually represent interaction between the motion input and the secondary input.

20 Claims, 6 Drawing Sheets

MULTI-PLATFORM MOTION-BASED COMPUTER INTERACTIONS

BACKGROUND

Computer gameplay is now widely available for a number of different computing devices. For example, computer games have been developed for home systems and portable systems such as tablets, mobile phones, and other devices. However, each device is generally supported by a specific gaming platform such that games for one device are not compatible with another device. As such, game players are unable to share a gaming experience unless each player has a compatible device. And even in cases where some degree of interoperability is achieved, prior solutions can be limited in the quality and character of interaction between devices.

SUMMARY

This Summary is provided to introduce a selection of concepts in a simplified form that are further described below in the Detailed Description. This Summary is not intended to identify key features or essential features of the claimed subject matter, nor is it intended to be used to limit, the scope of the claimed subject matter. Furthermore, the claimed subject matter is not limited to implementations that solve any or all disadvantages noted in any part of this disclosure.

Systems and methods for multi-platform motion interactivity are provided. The system includes a motion-sensing subsystem, a display subsystem including a display, a logic subsystem, and a data-holding subsystem containing instructions executable by the logic subsystem. The system is configured to display a displayed scene; receive a dynamically-changing motion input; from the motion-sensing subsystem that; is generated in response to movement of a tracked object; generate, in real time, a dynamically-changing 3D spatial model of the tracked object based on the motion input; control, based on the movement of the tracked object and using the 3D spatial model, motion within the displayed scene. The system further configured to receive, from a secondary computing system, a secondary input; and control the displayed scene in response to the secondary input to visually represent interaction between the motion input and the secondary input.

DETAILED DESCRIPTION

The disclosure is directed to systems and methods in which multiple computing devices interact to provide a multi-platform experience in which motion-sensing enhances the experience and interaction. The experience is shared by multiple participants in that they can control and influence the experience through interaction with their respective computing devices. Visual depictions of the experience may be provided on the user's respective displays, and/or on a shared display that the multiple users view. In addition, the experience in many examples is controlled at least in part by sensed motion (e.g., of a human user). The motion data controls one or more computing devices, for example by causing changes in displayed imagery. Additional inputs may be applied at one or more of the devices, so that the motion and other inputs combine to create a highly interactive and engaging experience for multiple users.

As an initial non-limiting example, a gaming console and associated depth camera can yield a displayed scene in which motions of a player are detected to yield corresponding motions in an on-screen avatar shown in the displayed scene. The gaming console can send the motion data to a smartphone or other device operated by a second player so that the second player can see a representation of the avatar's movements on the screen of the smartphone. The smartphone user can respond by applying an input (e.g., to the smartphone's touchscreen) which affects the avatar and the unfolding gameplay generated by the gaming console. This creates a shared experience in the form of dynamic visual gameplay depictions displayed on one or both of the game console's display and the smartphone's display.

Figure 1:
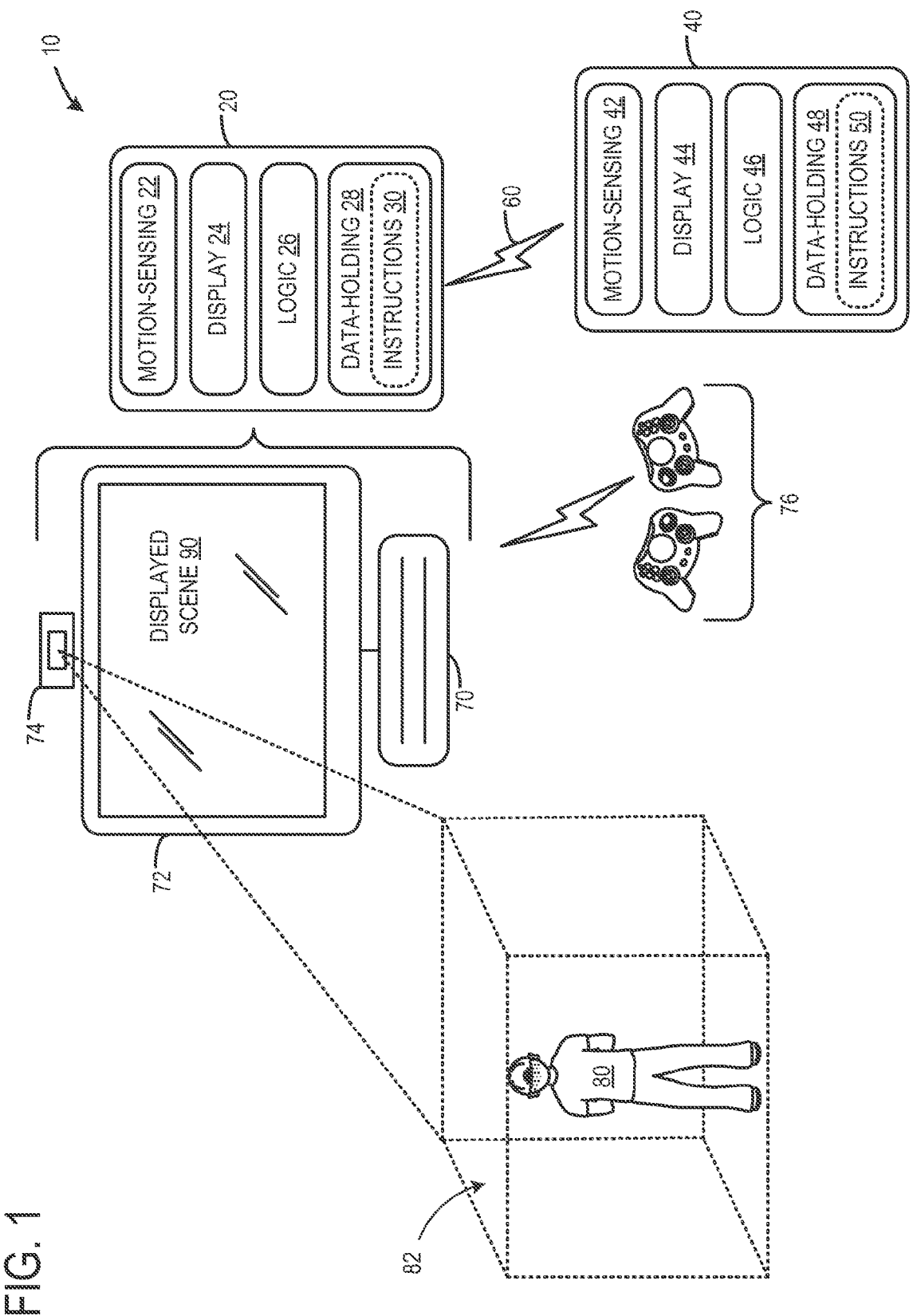
FIG. 1 schematically shows an example multi-platform system in accordance with a preferred embodiment of the present disclosure.

FIG. 1 depicts a multi-platform system 10 in which motion sensing and interaction between multiple devices provide a shared interactive experience. Although any number of computing devices and systems may participate, the depicted example involves interaction between two distinct computing systems: computing system 20 and computing system 40, which are interconnected via communication link 60. The depicted computing systems may be or include any type of computing device, and may be interconnected wirelessly or wired, through the Internet, via Bluetooth, local or wide-area networks, etc. Virtually any type of connection may be employed.

In the depicted example, the computing systems each have a motion-sensing subsystem (elements 22 and 42); a display subsystem (elements 24 and 44); a logic subsystem (elements 26 and 46); and a data-holding subsystem (elements 28 and 48) containing instructions (elements 30 and 50) that are executable by the respective logic subsystems microprocessors). As will be explained in detail below, the instructions may be executed to carry out motion-based and other types of interactivity between the devices. The systems also include communications software/hardware for communicating and interacting via communication link 60, which as indicated above, may be the Internet or virtually any other type of network, link or other connection mechanism.

In the example of FIG. 1, computing system 20 is a gaming system in which data-holding and logic/processing features are incorporated into gaming console 70, which is operatively interconnected with a high-definition television (HDTV) display 72 and a motion sensor in the form of depth camera 74. A nearly limitless variety of other components may be used in connection with gaming console 70 or computing system 40. For example, gaming console may be coupled with peripheral gaming components such as controllers 76. Therefore, in some embodiments, the motion-sensing system may employ gesture interpretation and a variety of user-interface features that are included in or performed in prior systems using conventional gaming controllers. Although a depth camera is shown in the present example, a variety of other motion-sensing technologies may be employed without departing from the spirit of the disclosure. For example, multi-platform system 10 may include one or more of an accelerometer, a gyroscope, stereo vision, active marker tracking, and passive marker tracking technologies.

Depth camera 74 is configured to track position and motion of a target 80 (e.g., a human user) within a capture volume 82 in real-time. This yields a dynamically-changing motion input which is processed to create a dynamically-changing 3D spatial model associated with target 80. The 3D spatial model, in turn, is used to control computing system 20 and/or computing system 40, for example by controlling motion within a displayed scene 90 on HDTV 72. For example, motion of a human user could be used to control movement of a third-person avatar in a virtual reality scene. In another example, motion of the human user controls a first-person view within a virtual reality scene.

In the example of FIG. 1, computing system 40 may be referred to as a secondary computing system. This should not be understood as implying that one system or the other is primary or more important than the other. The terminology is used simply for clarity to distinguish the two systems. In one class of examples, inputs can be applied at the secondary computing system to affect a shared experience, such as a gameplay sequence displayed on one or both of HDTV 72 and a display associated with the secondary computing system 40. For example, computing system 20 may receive a communication from the secondary computing system 40 in response to a user input applied at the secondary computing system. The first system (i.e., system 20) may then use this input to control displayed scene 90. Thus, the displayed scene is controlled based on motion and other inputs to provide a visual representation of multi-device interaction. One aspect of the system that can greatly enhance multi-player cross-platform interactivity is the ability to share motion data between devices. Motion may be detected by one or more of the interacting devices, and this motion data can be communicated between devices to control the shared interactive experience.

Figure 2:
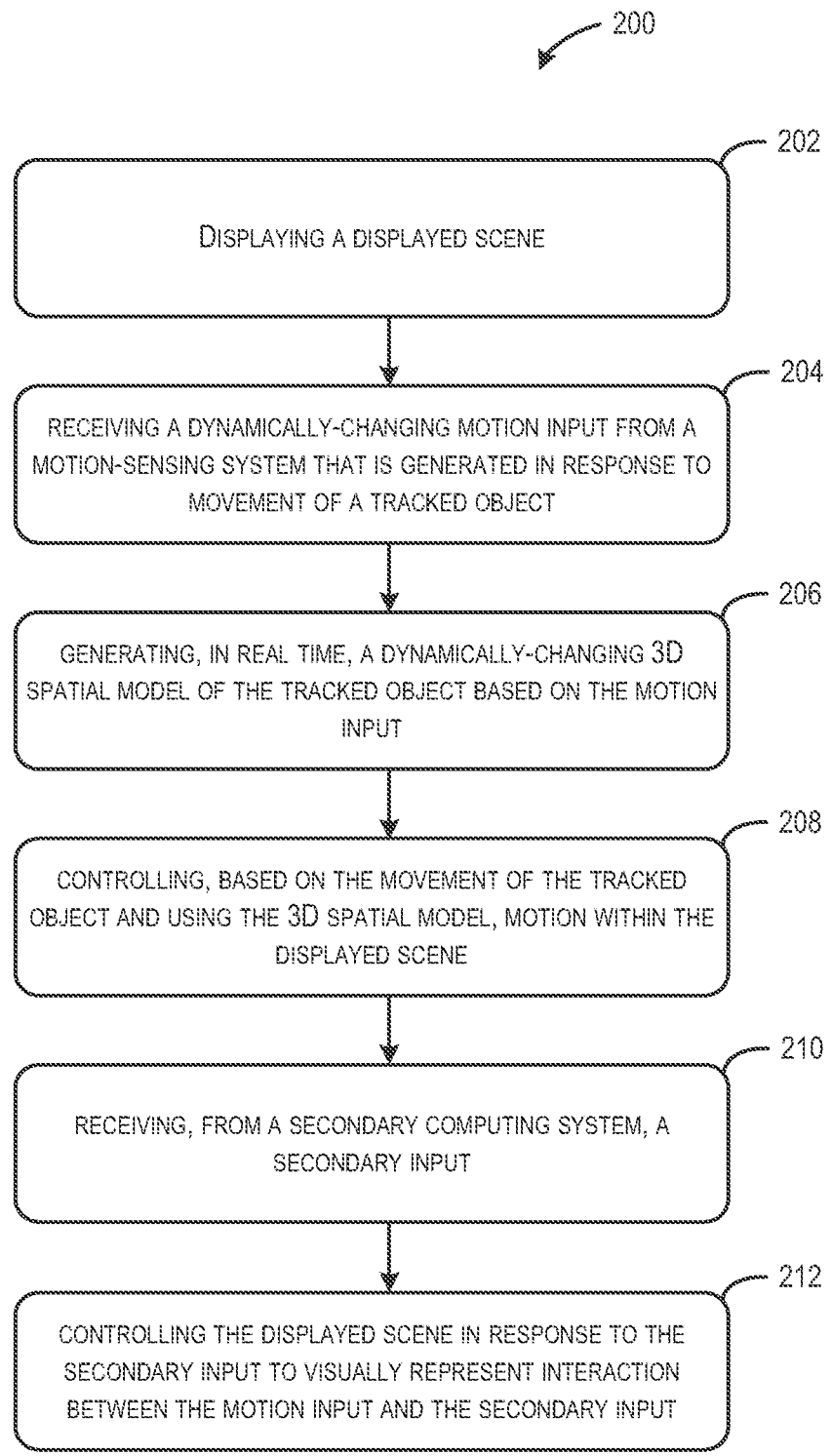
FIG. 2 illustrates an example method for controlling a software application using the system of FIG. 1.

An example method 200 of providing multi-platform motion interactivity is shown in FIG. 2. Though method 200 will first be described generally, its steps will be referenced in later discussions of specific examples. Method 200 may be carried out through execution of instructions on any type of computing device or devices. Although it can be employed in connection with the particular machines of FIG. 1, it will be appreciated that the method may be employed in a variety of other settings.

Method 200 includes, at 202, displaying a displayed scene on a display of a first computing system. At 204, the method includes receiving a dynamically-changing motion input from a motion-sensing system that is generated in response to movement of a tracked object. At 206, the method includes generating, in real time, a dynamically-changing 3D spatial model of the tracked object based on the motion input. At 208, the method includes controlling, based on the movement of the tracked object and using the 3D spatial model, motion within the displayed scene. At 210, the method includes receiving a secondary input from a secondary computing system. At 212, the method includes controlling the displayed scene in response to the secondary input to visually represent interaction between the motion input; and the secondary input.

It will be appreciated that method 200 is provided by way of example and may include additional or alternative steps than those illustrated in FIG. 2. As one example, method 200 may include controlling a display of a virtual element in response to the secondary input. In this way, a multi-platform system may permit virtual interaction between the virtual element and the virtual output associated with the tracked object.

Figure 3:
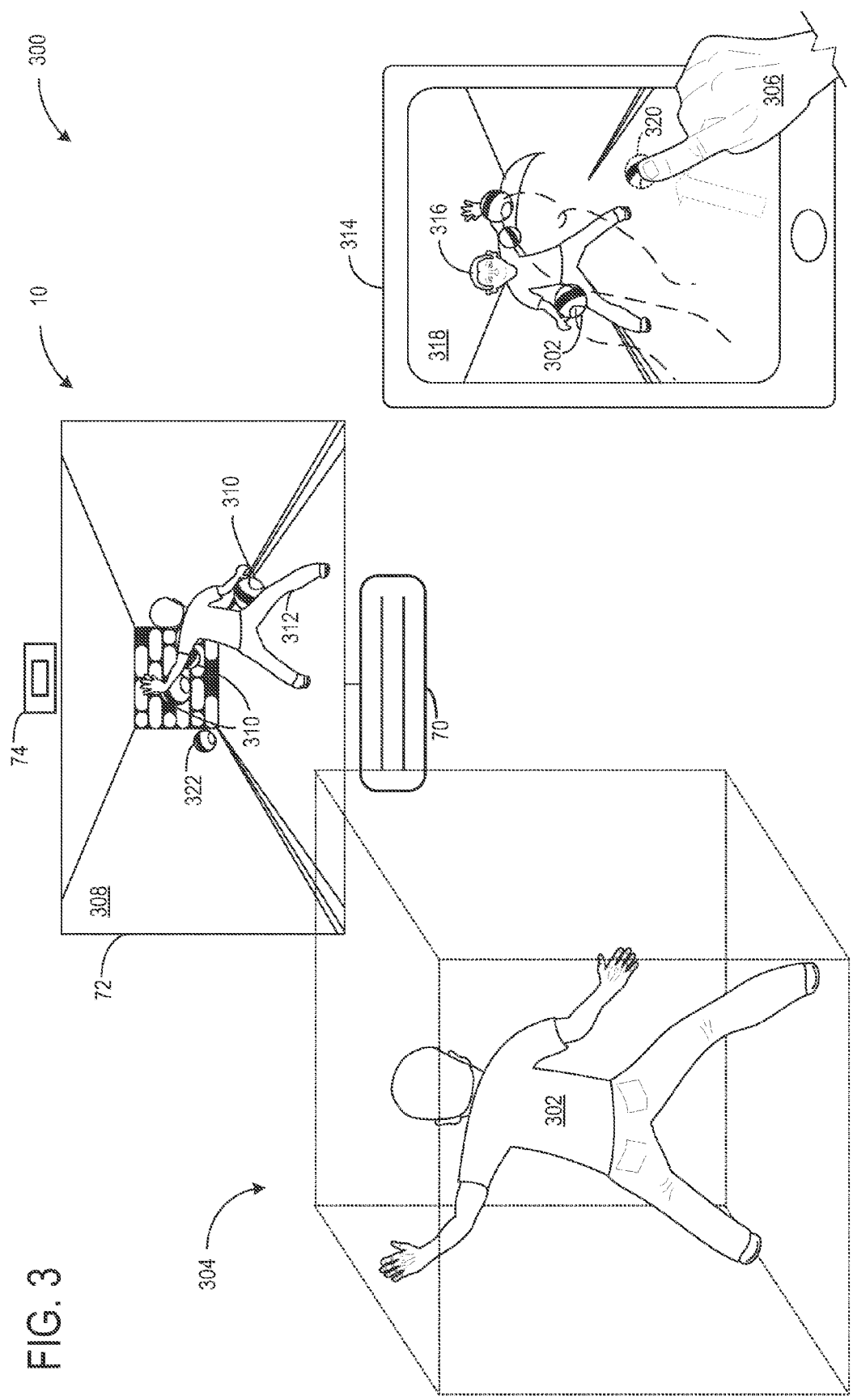
FIG. 3 shows an example user interface associated with the system of FIG. 1.

Referring now to FIG. 3, the systems and methods will be described in the context of a video game in which a player's avatar is shown looking down a corridor toward a virtual wall of blocks. Virtual balls fly toward the avatar from the end of the corridor. The object of the game is for the avatar to use their virtual hands to either catch the balls or strike the balls with virtual hands (e.g., hands of a depicted avatar that are controlled in real time in response to the user moving their hands). Striking the balls may cause them to fly back toward the wall at the end of the corridor (e.g., as in the sport of handball). As balls return to the wall, they knock out the individual bricks of the wall. The player completes a level by knocking out all of the bricks, and a score may be assigned based on how quickly the player knocks out the entire wall. The avatar is controlled in response to the movement of a target, i.e., the human player positioned within the capture volume.

FIG. 3 shows an example multi-platform gaming environment 300. As shown, environment 300 includes primary game player 302 within capture volume 304, and secondary game player 306. First player 302 may interact with multi-platform system 10 via captured motion and other types of input, while second player 306 may interact via touch input and other interactions with secondary device 314.

In the example provided, game players may utilize a gaming system to play a ball game. The ball gameplay involves the avatar interacting with virtual objects in displayed scene 308. As just mentioned, the virtual objects may take the form of one or more balls 310 which fly toward the user. In response to the detected motion and accompanying control of avatar 312, motion data may be communicated to the secondary device 314 (e.g., a tablet computer). The communicated motion data may be used, for example, to display a moving avatar representation 316, which is controlled in response to movements of first player 302 and avatar 312. Thus, second player 306 can see exactly how first game player 302/avatar 312 is moving.

In response to the depicted moving avatar on display 318, second player 306 can apply inputs to yield an interaction between the users. In the depicted example, second player 306 touches specific location 320 on the touch interactive display 318 of secondary device 314. In response, a new ball 322 is introduced into a particular corresponding location on the displayed scene at HDTV 72. For example, if first player 302 and avatar 312 moved to the far right of the scene such that moving avatar representation 316 moves to the left (from the perspective of second player 306), second player 306 might introduce a ball at the far right, in an attempt to make it more difficult or challenging for first player 302 to use their hands and hit the ball back toward the virtual brick wall at the end of the corridor. In this way, new ball 322 may be a virtual element that is displayed in response the secondary input provided by second player 306.

In this ball game example, a variety of other inputs may be applied by the two users. The user of the tablet computer might also shake the device to produce accelerometer/gyroscope controls, and/or apply swipe or multi-touch inputs to touch interactive display 318. The motion-capture user can make any number of gestures that may be interpreted by console 70 and used to control the shared experience displayed at display 308 and/or display 318.

It will be appreciated that FIG. 3 is provided as an example and other configurations are possible without departing from the scope of this disclosure. For example, touch interactive display 318 shows a perspective view of the gameplay interface that is different from the perspective view of displayed scene 308. It is to be understood that each device in multi-platform gaming environment 300 may display the same or different perspective view of the gameplay interface.

Further, it will be appreciated that the multi-platform gaming environment may be implemented for other games and/or applications than the example provided in FIG. 3. For example, a first player may control a virtual, goalkeeper through detected motion and a second player may control a shooter via a secondary device, similar to the above described example. In this example, a shot on goal may be delivered in response to the second player providing touch input through the secondary device in an effort to score a goal. In response to detected motion of the first player, the virtual goalkeeper may block the shot, the shooter may score a goal, or the shot may be off target missing the goal. This type of gaining scenario may be implemented for a soccer game, a hockey game, a lacrosse game, and other suitable games, for example.

In this and the other examples herein, the shared experience can be implemented in a variety of ways to create an engaging shared experience. Instead of being co-located (e.g., two players in a living room), interaction may occur remotely via social networks, the Internet or any other communication mechanism. For example, the tablet user could be commuting home from work on public transportation while the motion-captured user is playing at home in their living room.

Figure 4:
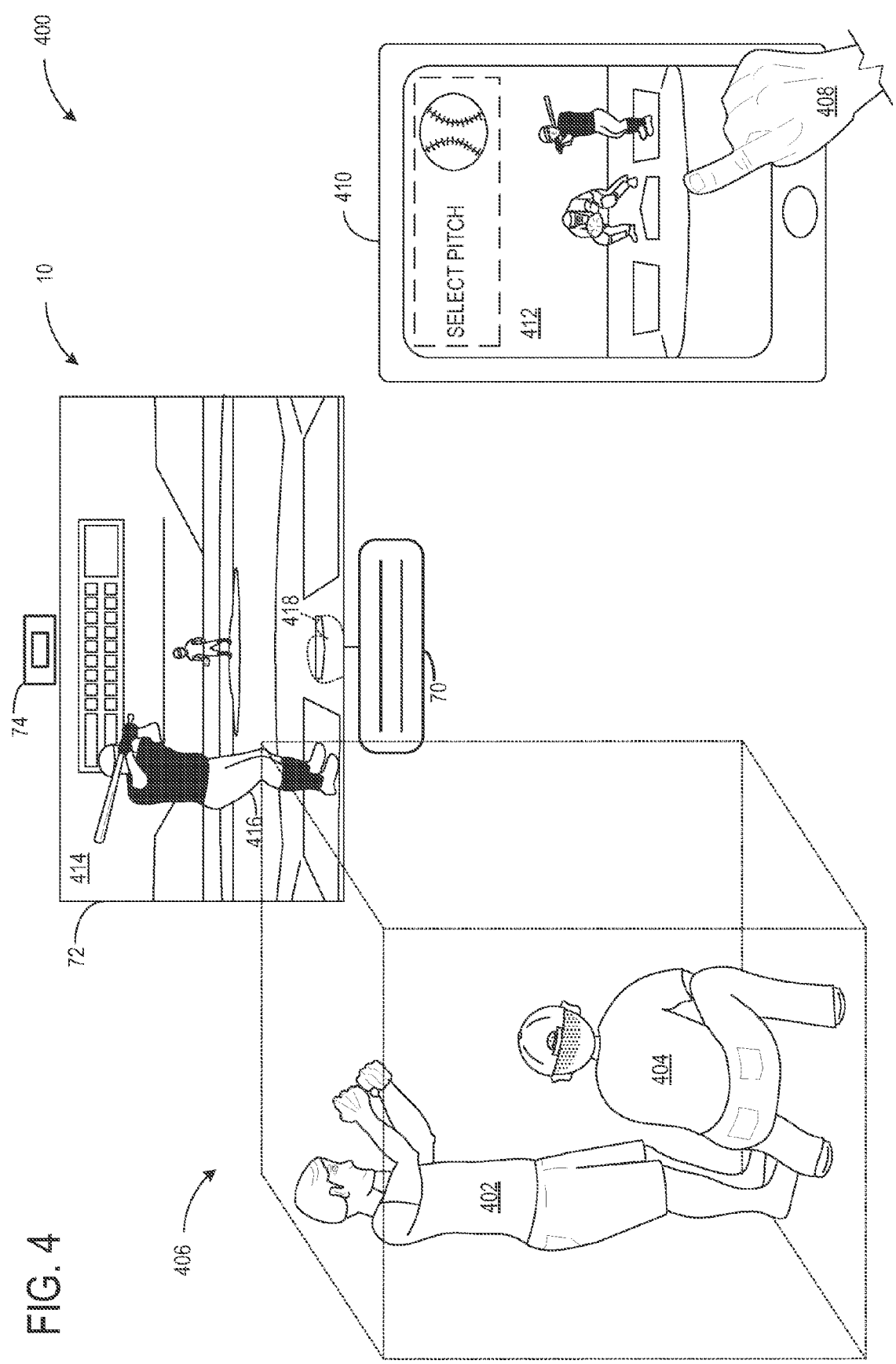
FIG. 4 shows another example user interface associated with the system of FIG. 1.

FIG. 4 shows another example gameplay interface in accordance with a multi-platform gaming system. As shown, multi-platform gaming environment 400 includes first player 402 and second player 404 within capture volume, as well as third player 408. First player 402 and second player 404 may interact with multi-platform system 10 via captured motion, while third player 408 may interact via touch input received by tablet computing device 410, for example. Though captured motion and touch interactivity are specifically discussed, it will be appreciated that the multi-platform gaming system is configured to interpret virtually any type of data input.

In this example, the three players are playing a baseball video game. One interaction in the game involves the motion-captured player in the role of the batter, with the tablet user controlling the pitcher. The tablet; user may provide touch input to select; a particular pitch, select an area over the plate to deliver the pitch, check off a base runner, throw to first base, deliver the pitch etc. For example, the tablet user may "throw" the pitch by swiping touch interactive display 412 to impart curve to the pitched ball.

The tablet user's inputs are communicated to game console 70 to control displayed scene 414, in particular by representing the pitched ball flying in toward the batter avatar 416 which in turn is controlled in real-time in accordance with movements of the motion-captured player, for example first player 402. As the motion-captured player "swings," the accompanying motion data is ported over to tablet computing device 410 so as to show the tablet user the corresponding movement of the avatar 416 displayed on the tablet.

Second player 404 may also be a motion-captured player and may provide a signal to the tablet user that may be communicated to tablet user on display 412. For example, second player 404 may be a catcher and may communicate a desired pitch, such as a curveball, to the tablet user by pointing two fingers down. As shown, second player 404 may be associated with virtual image 418, such that second player 404 has a first person virtual perspective of displayed scene 414. In this way, the movement of second player 404 may provide motion data to catch the ball after a pitch.

It will be appreciated that the user of tablet device 410 may provide input for other virtual baseball players. For example, if the motion-captured user successfully "swings" so as to hit the ball, the flying of the ball through the air may be depicted at display 412, and the tablet user may apply various inputs to try and control a catching operation (e.g., an attempt; by a depicted outfielder to catch a fly ball).

It is to be understood that FIG. 4 is provided as a non-limiting example of a gameplay interface in accordance with a multi-platform gaming system. Other variations are possible without departing from the scope of this disclosure.

FIGS. 3 and 4 depict a primary user interface (e.g., displayed scenes 308 and 414) and a secondary user interface (e.g., displays 318 and 412). Depicted within the scene is a third-person avatar (e.g., avatars 312 and 416), whose movements are controlled based on movements of the corresponding human user(s) within the capture volume (as detected by depth camera 74 of FIG. 1). The movement of user may be tracked optically and in real time to generate a dynamic 3D spatial model. Changes to the model which occur as the user moves are processed to produce corresponding control so that the third-person avatar moves in the same way as the human user.

Figure 5:
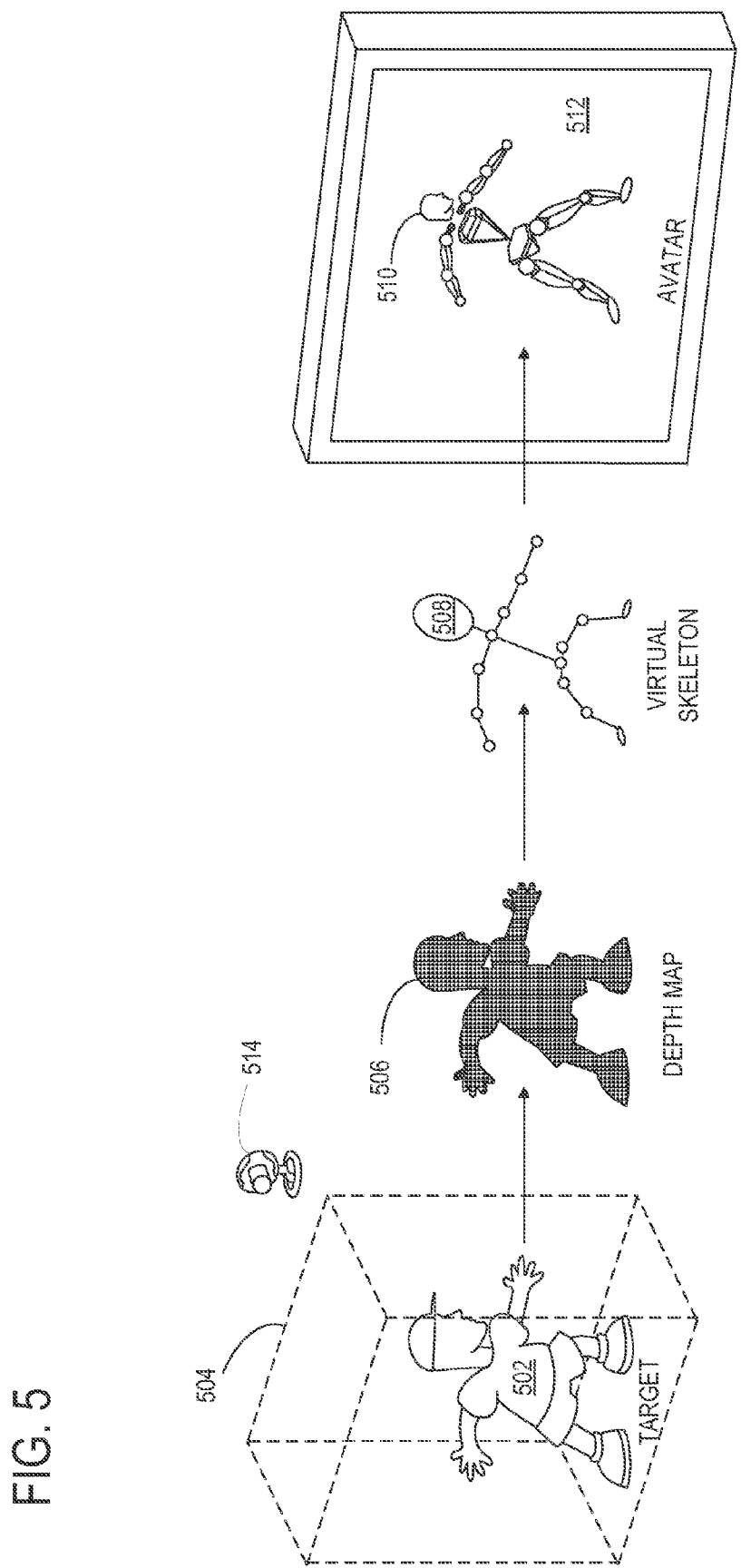
FIG. 5 schematically shows an example pipeline to generate an avatar from a human target; using the system of FIG. 1.

FIG. 5 shows a simplified processing pipeline in which target 502 in capture volume 504 is modeled as a virtual skeleton 508 that can be used to draw an avatar 510 on display device 512 and/or serve as a control input for controlling other aspects of a game, application, and/or operating system. It will be appreciated that a processing pipeline may include additional steps and/or alternative steps than those depicted in FIG. 5 without departing from the scope of this disclosure.

As shown in FIG. 5, target 502 and the rest of capture volume 504 may be imaged by a capture device such as depth camera 514. The depth camera may determine, for each pixel, the depth of a surface in the capture volume relative to the depth camera. Virtually any depth finding technology may be used without departing from the scope of this disclosure.

The depth information determined for each pixel may be used to generate a depth map 506. Such a depth map may take the form of virtually any suitable data structure, including but not limited to a matrix that includes a depth value for each pixel of the observed scene. In FIG. 5, depth map 506 is schematically illustrated as a pixelated grid of the silhouette of target 502. This illustration is for simplicity of understanding, not technical accuracy. It is to be understood that a depth map generally includes depth information for all pixels, not just pixels that image target 502, and that the perspective of depth camera 514 would not result in the silhouette depicted in FIG. 5.

Virtual skeleton 508 may be derived from depth map 506 to provide a machine readable representation of target 502. In other words, virtual skeleton 508 is derived from depth map 506 to model target 502. The virtual skeleton 508 may be derived from the depth map in any suitable manner. In some embodiments, one or more skeletal fitting algorithms may be applied to the depth map. The present disclosure is compatible with virtually any skeletal modeling techniques.

The virtual skeleton 508 may include a plurality of joints, each joint corresponding to a portion of the target. In FIG. 5, virtual skeleton 508 is illustrated as a fifteen-joint stick figure. This illustration is for simplicity of understanding, not technical accuracy. Virtual skeletons in accordance with the present disclosure may include virtually any number of joints, each of which can be associated with virtually any number of parameters three dimensional joint, position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc).

As shown in FIG. 5, an avatar 510 may be rendered on display device 512 as a visual representation of virtual skeleton 508. Because virtual skeleton 508 models target 502, and the rendering of the avatar 510 is based on the virtual skeleton 508, the avatar 510 serves as a viewable digital representation of the target 502. As such, movement of avatar 510 on display device 512 reflects the movements of target 502.

As described above, movement of avatar 510 on display device 512 may be communicated to a secondary computing device, such that a representation of avatar 510 can be visualized on a display of the secondary computing device. Further, input from a user of the secondary computing device may be communicated to display device 512.

Figure 6:
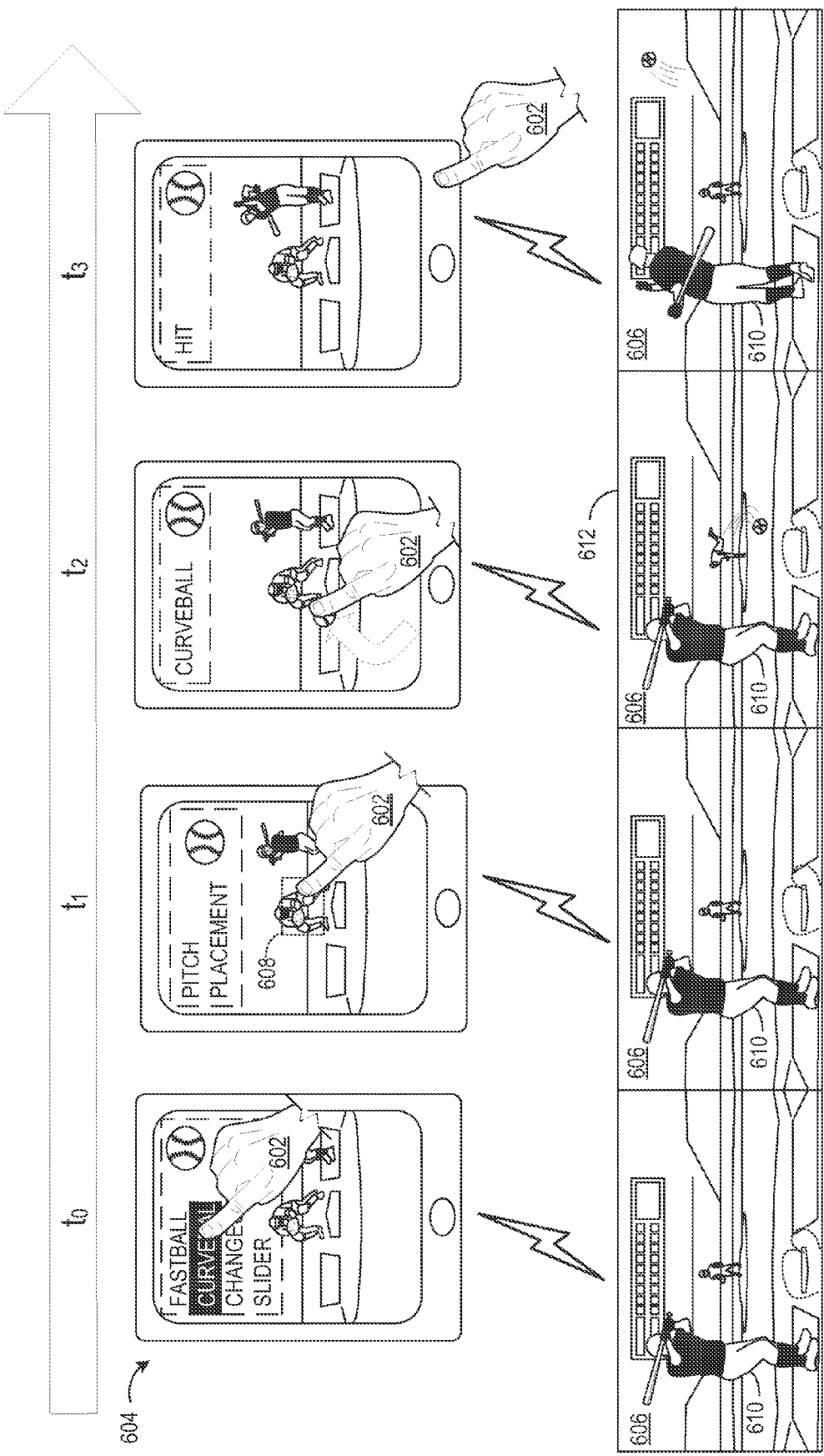
FIG. 6 schematically shows an example timeline of secondary input controlling aspects of the system of FIG. 1.

For example, FIG. 6 schematically shows a user 602 providing input via secondary computing device 604 at different moments in time (e.g., time $t_0$, time $t_1$, time $t_2$, and time $t_3$). Such input may be communicated to a multi-platform gaming system (e.g. multi-platform system 10 of FIG. 1) and presented on display 606 of a primary computing device (e.g. computing device 20 of FIG. 1).

Continuing with the baseball gameplay scenario provided above, FIG. 6 shows user 602 selecting 'curveball' at time $t_0$. At time $t_1$, user 602 selects a location within strike box 608. Such a location may indicate a position where the pitcher wants to deliver the pitch. At time $t_2$, user 602 makes an arched swipe to throw the curveball. As such, display 606 may show the pitch heading towards batter 610, as indicated at 612. As described above, batter 610 is a third-person avatar and thus may reflect the movements of a human target player 402 of FIG. 4). At time $t_3$, batter 610 hits the ball and thus display 606 shows the ball heading towards right field, for example. Further, a virtual representation of the displayed scene depicted on display 606 is represented on a display of secondary computing device 604, as described above. In this way, a displayed scene of the secondary computing system is changeable in response to movement of the tracked object (e.g., game player 402 of FIG. 4). Likewise, a displayed scene of the primary computing device (e.g., display 606) is changeable in response to the secondary input.

In the example shown, user 602 provides input that controls the gameplay sequence. Such input is provided through secondary, computing device 604. Such input is communicated to a primary computing device for display. In this way, a game player with a secondary computing device may enrich the gaming experience by controlling some aspects of the game via inputs detected by the secondary computing device and communicated to the primary computing device.

It will be appreciated that FIG. 6 is shown by way of example and other inputs, movements and/or gestures are possible without departing from the scope of this disclosure. As a non-limiting example, a secondary game player may select to throw to first base in order to tag a base runner. Further, other inputs may be possible. For example, the secondary computing device may include and accelerometer and the user may hold the computing device while winding up and 'throwing.' The speed of the windup may be provided as input for the speed of the pitch to the mound.

It will be appreciated that the multi-platform gaming experiences described above have been provided as examples and are thus non-limiting. As additional examples, the multi-platform gaming system may be employed for an obstacle course game, a football game, or virtually any suitable game. It will be appreciated that each game may optionally include a secondary player providing gameplay input via a secondary computing device. In other words, games in accordance with a multi-platform gaming system may be played without a secondary player providing input via a secondary computing device. Further, the multi-platform gaining system may be configured to communicate with more than one secondary computing device. Using the baseball game example, a user with a tablet may play the role of the pitcher, while another user with a mobile phone may play the role of an outfielder, for example. Virtually any number of game players using any type of computing device may provide input to the multi-platform gaming system without departing from the scope of this disclosure. In this way, the gaming experience is shared among different users via their respective devices.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

In some embodiments, the above described methods and processes may be tied to a computing system including one or more computers. In particular, the methods and processes described herein may be implemented as a computer application, computer service, computer API, computer library, and/or other computer program product.

As discussed above. FIG. 1 schematically shows a nonlimiting example of a computing system that can carry out the avatar-based user interface systems/methods discussed herein. Although FIG. 1 shows a gaming-console example, it is to be understood that virtually any computer architecture may be used without departing from the scope of this disclosure. In alternate embodiments, the computing system may take the form of a mainframe computer, server computer, desktop computer, laptop computer, tablet computer, home entertainment computer, network computing device, mobile computing device, mobile communication device, etc.

As indicated in FIG. 1, the example computing system includes a logic subsystem and a data-holding subsystem. The computing system may also include a display subsystem, communication subsystem, and/or other components not shown in FIG. 1. The system may also optionally include user input devices such as keyboards, mice, game controllers, cameras, microphones, and/or touch screens, for example.

The logic subsystem may include one or more physical devices configured to execute one or more instructions. For example, the logic subsystem may be configured to execute one or more instructions (e.g., the described user interface instructions) that are part of one or more applications, services, programs, routines, libraries, objects, components, data structures, or other logical constructs. Such instructions may be implemented to perform a task, implement a data type, transform the state of one or more devices, or otherwise arrive at a desired result.

As described above, the instructions may be configured to display a displayed scene, receive dynamically changing motion input in response to a tracked object, generate a dynamically-changing 3D spatial model of the tracked object, receive secondary input, and control the displayed scene in response to the motion input and the secondary input. The instructions may be further configured to transmit to the secondary computing system, a motion output based on the 3D spatial model. In this way, the secondary computing system is permitted to visually represent movement of the tracked object.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem may include one or more physical, non-transitory, devices configured to hold data and/or instructions executable by the logic subsystem to implement the herein described methods and processes. When such methods and processes are implemented, the state of data-holding subsystem may be transformed (e.g., to hold different data).

The data-holding subsystem may include removable media and/or built-in devices. The data-holding subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and data-holding subsystem may be integrated into one or more common devices, such as a gaming console, application specific integrated circuit or a system on a chip.

The data-holding subsystem may include removable computer-readable storage media, which may be used to store and/or transfer data and/or instructions executable to implement the herein described methods and processes. The removable computer-readable storage media may take the form of CDs, DVDs, Blu-Ray Discs, EEPROMs, and/or floppy disks, among others.

It is to be appreciated that the data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system that is implemented to perform one or more particular functions. In some cases, such a module, program, or engine may be instantiated via a logic subsystem executing instructions held by a data-holding subsystem (e.g., instructions 30 and 50 respectively stored in data-holding subsystems 28 and 48—FIG. 1). It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, a display subsystem may be used to present a visual representation of data held by a data-holding subsystem. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with a logic subsystem and/or data-holding subsystem in a shared enclosure, or such display devices may be peripheral display devices.

When included, a communication subsystem may be configured to communicatively couple the computing system with one or more other computing devices. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired ride area network, etc. in some embodiments, the communication subsystem may allow the computing system to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various ads illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A first computing system comprising:
   a motion-sensing subsystem configured to receive video from a camera connected to the first computing system, the video capturing movement of a user of the first computing system;
   a display subsystem including a display;
   a logic subsystem;
   a data-holding subsystem containing instructions executable by the logic subsystem to:
   display a scene on the display;

generate, based on the video received in the motion-sensing subsystem, a dynamic 3D model of the user including a plurality of movable joints, to track the movement of the user in real time;
control, motion within the displayed scene based on the dynamic 3D model;
receive from a secondary computing system a secondary user input; and
control the displayed scene in response to the secondary user input, to visually represent interaction between the movement of the user and the secondary user input.

2. The computing system of claim 1, where control of the displayed scene in response to the secondary user input includes controlling display of a virtual element within the displayed scene in response to the secondary user input, the instructions being further executable to permit virtual interaction with the virtual element via the movement of the user and corresponding changes of the dynamic 3D model.

3. The computing system of claim 1, where the instructions are further configured to transmit, to the secondary computing system, a motion output based on the dynamic 3D model, the motion output being configured to permit the secondary computing system to visually represent movement of the user.

4. The computing system of claim 3, where control of the displayed scene in response to the secondary input includes controlling display of a virtual element within the displayed scene in response to the secondary user input, the instructions being further executable to permit virtual interaction with the virtual element via the movement of the user and corresponding changes of the dynamic 3D model.

5. The computing system of claim 3, where the motion output is transmitted wirelessly to the secondary computing system.

6. The computing system of claim 3, where visually representing movement of the user at the secondary computing system includes displaying, on a display of the secondary computing system, an object location within a displayed scene which is changeable in response to movement of the user.

7. The computing system of claim 1, where the secondary computing system is remotely located.

8. The computing system of claim 1, where the secondary user input is generated in response to user interaction with an interactive display of the secondary computing system.

9. The computing system of claim 1, where the secondary user input is generated in response to motion sensing at the secondary computing system.

10. In a first computing system, a method to share control of a displayed scene with a secondary computing system, the method comprising:
displaying the scene on a display of the first computing system;
receiving video from a camera connected to the first computing system, the video capturing movement of a user of the first computing system;
generating, based on the video, a dynamic 3D model of the user including a plurality of movable joints, to track the movement of the user in real time;
controlling motion within the displayed scene based on the dynamic 3D model;
receiving from the secondary computing system a secondary user input; and
controlling the displayed scene in response to the secondary user input, to visually represent interaction between the movement of the user and the secondary user input.

11. The method of claim 10, where controlling the displayed scene in response to the secondary input further includes controlling display of a virtual element within the displayed scene in response to the secondary user input.

12. The method of claim 11, further including permitting virtual interaction between the virtual element and a virtual representation of the user.

13. The method of claim 10, where the secondary computing system is remotely located.

14. The method of claim 10, where the secondary user input is generated in response to user interaction with an interactive display of the secondary computing system.

15. The method of claim 14, where the user interaction is a user touch detected by the interactive display of the secondary computing system.

16. The method of claim 14, where the user interaction is a user swipe detected by the interactive display of the secondary computing system.

17. The method of claim 10, where the secondary user input is generated in response to motion sensing at the secondary computing system.

18. The method of claim 10, further comprising displaying a display of the secondary computing system that visually represents the movement of the user.

19. The method of claim 10, where the secondary input is transmitted wirelessly to the first computing system.

20. A first computing system comprising:
a real-time motion-sensing subsystem configured to receive video from a camera connected to the first computing system, the video capturing movement of a user of the first computing system;
a display subsystem including a display;
a logic subsystem;
a data-holding subsystem containing instructions executable by the logic subsystem to:
display a scene on the display;
generate, based on the video received in the motion-sensing subsystem, a dynamic 3D model of the user including a plurality of movable joints, to track the movement of the user in real time;
control motion within the displayed scene based on the dynamic 3D model;
receive from a secondary computing system a secondary user input;
transmit to the secondary computing system, a motion output based on the dynamic 3D model, the motion output being configured to permit the secondary computing system to visually represent the movement of the user;
control the displayed scene including display of a virtual element within the displayed scene in response to the secondary user input to visually represent interaction between movement of the user and the secondary user input; and
permit virtual interaction with the virtual element via the movement of the user and corresponding changes of the dynamic 3D model.

* * * * *